US010894474B2

(12) United States Patent
Arras et al.

(10) Patent No.: US 10,894,474 B2
(45) Date of Patent: Jan. 19, 2021

(54) TANK SYSTEM OF A MOTOR VEHICLE COMPRISING A VOLUME-MODIFYING ELEMENT

(71) Applicant: Bayerische Motoren Werke Aktiengesellschaft, Munich (DE)

(72) Inventors: Emmanuel Arras, Munich (DE); Markus Brater, Marklkofen (DE); Martin Bauer, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 16/178,685

(22) Filed: Nov. 2, 2018

(65) Prior Publication Data

US 2019/0070953 A1    Mar. 7, 2019

Related U.S. Application Data

(63) Continuation of application No. PCT/EP2017/058333, filed on Apr. 7, 2017.

(30) Foreign Application Priority Data

May 4, 2016    (DE) .................... 10 2016 207 741

(51) Int. Cl.
| | | |
|---|---|---|
| *B60K 15/035* | (2006.01) | |
| *B60K 15/03* | (2006.01) | |
| *B60S 5/02* | (2006.01) | |

(52) U.S. Cl.
CPC ........ *B60K 15/03519* (2013.01); *B60K 15/03* (2013.01); *B60K 2015/03085* (2013.01);
(Continued)

(58) Field of Classification Search
CPC ................ B60K 15/03504; B60K 2015/03085
See application file for complete search history.

(56) References Cited

U.S. PATENT DOCUMENTS 3,617,034 A * 11/1971 Skinner ............ B60K 15/03504
261/22
3,752,355 A * 8/1973 Weissenbach ... B60K 15/03504
220/86.1
(Continued)

FOREIGN PATENT DOCUMENTS

| DE | 10 2007 014 849 A1 | 10/2008 |
|---|---|---|
| DE | 10 2008 046 586 A1 | 3/2010 |
| WO | WO 2016/012284 A1 | 1/2016 |

OTHER PUBLICATIONS

International Search Report (PCT/ISA/210) issued in PCT Application No. PCT/EP2017/058333 dated Jun. 22, 2017 with English translation (six (6) pages).
(Continued)

*Primary Examiner* — Timothy P. Kelly
(74) *Attorney, Agent, or Firm* — Crowell & Moring LLP

(57) ABSTRACT

A tank system of a motor vehicle includes a volume-modifying element, which is provided in the interior of the fuel tank at least substantially above the liquid level and which is designed as a deformable bag, which forms a compensation volume connected to the environment, and includes a valve assembly, which closes under the control of a float during the filling of the fuel tank and thus brings about a maximum fill level in the fuel tank. A measure is provided for eliminating an effect of the volume-modifying element on the maximum fill level height. This measure can be that the volume-modifying element is arranged in the fuel tank such that, when the vehicle is standing on a horizontal surface, the top side of the volume-modifying element is not significantly above the fuel fill level at which the valve assembly closes in the vertical axis direction. Other measures include, for example, a controllable valve, which is provided in the connection between the compensation volume of the volume-modifying element and the environment
(Continued)

and which is actuated in the closing direction when the fill level rising during the filling process has reached the maximum fill level height.

6 Claims, 2 Drawing Sheets

(52) U.S. Cl.
CPC ............... *B60K 2015/03368* (2013.01); *B60K 2015/03566* (2013.01); *B60K 2015/03576* (2013.01); *B60S 5/02* (2013.01)

(56) References Cited

U.S. PATENT DOCUMENTS

| | | | | |
|---|---|---|---|---|
| 5,460,135 A | * | 10/1995 | Ohashi ................... | B60K 15/03 123/518 |
| 5,746,186 A | * | 5/1998 | Kidokoro ............... | B60K 15/03 123/516 |
| 2011/0005609 A1 | | 1/2011 | Suzuki et al. | |
| 2013/0075394 A1 | | 3/2013 | Suzuki | |
| 2017/0087980 A1 | | 3/2017 | Arras et al. | |

OTHER PUBLICATIONS

German-language Written Opinion (PCT/ISA/237) issued in PCT Application No. PCT/EP2017/058333 dated Jun. 22, 2017 (five (5) pages).

\* cited by examiner

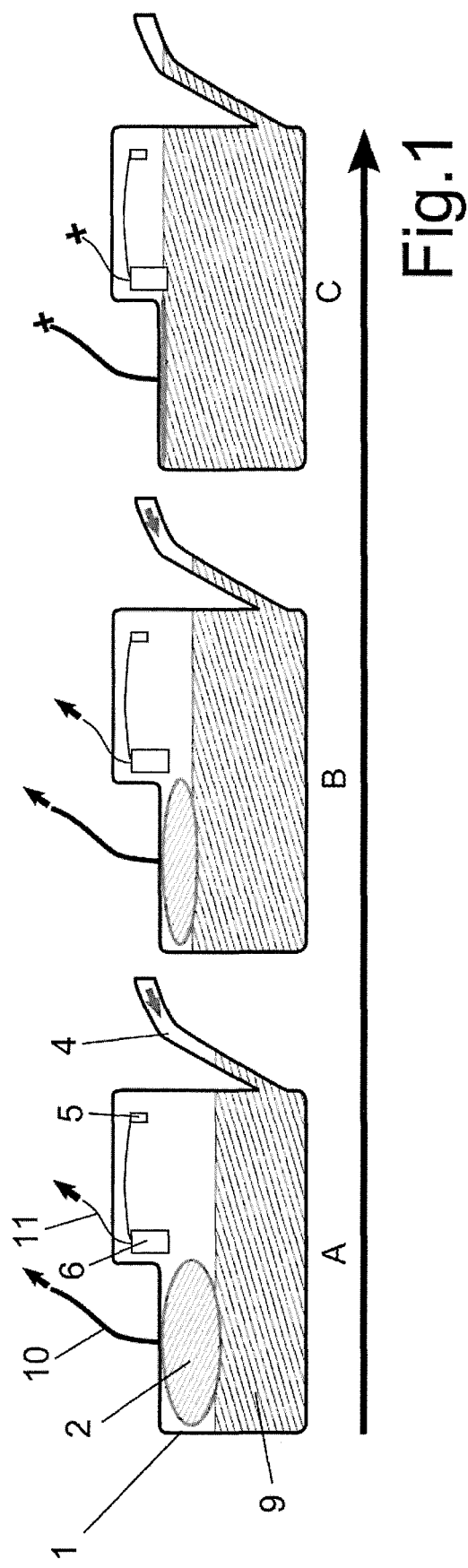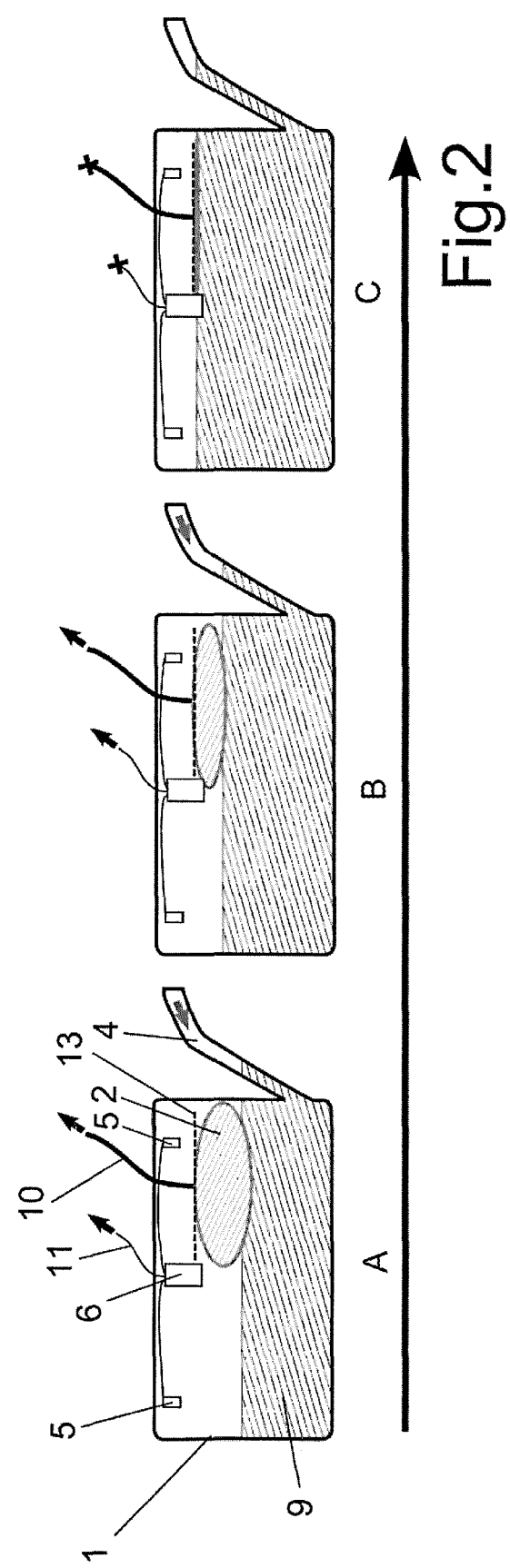

TANK SYSTEM OF A MOTOR VEHICLE COMPRISING A VOLUME-MODIFYING ELEMENT

CROSS REFERENCE TO RELATED APPLICATIONS

This application is a continuation of PCT International Application No. PCT/EP2017/058333, filed Apr. 7, 2017, which claims priority under 35 U.S.C. § 119 from German Patent Application No. 10 2016 207 741.4, filed May 4, 2016, the entire disclosures of which are herein expressly incorporated by reference.

BACKGROUND AND SUMMARY OF THE INVENTION

The invention relates to a tank system of a motor vehicle with a volume-modifying element provided in the interior of the fuel tank at least substantially above the liquid level, which volume-modifying element forms a compensating volume which is connected to the surroundings, in particular with one of the features shown in WO 2016/012284.

The technical background of a motor vehicle tank system with what is known as a volume-modifying element is also described in detail as an advantageous configuration of such a tank system in the above-mentioned specification, to which specification reference is expressly incorporated herein. In particular, a tank system according to WO 2016/012284, a U.S. family member of which is US 2017/0087980, should advantageously be further developed in terms of functional reliability and in particular in terms of safe filling of the fuel tank.

The solution which achieves this object is a tank system of a motor vehicle with a volume-modifying element provided in the interior of the fuel tank at least substantially above the liquid level, which volume-modifying element forms a compensating volume which is connected to the surroundings, and with a valve arrangement which closes in a float-controlled manner when filling the fuel tank and thus brings about a maximum fill level in the fuel tank. A measure is provided for eliminating an influence of the volume-modifying element on the maximum fill level.

It has been recognized that a volume-modifying element which is provided in the tank interior and is connected to the surroundings can have an effect on the maximum fill level in the fuel tank during filling of the fuel tank with fuel. The maximum fill level is (namely) normally determined by a float-controlled valve arrangement, wherein air or gasses which is/are located initially in the fuel tank and which is/are displaced during filling of the tank by the introduced fuel is/are discharged out of the tank interior through the initially open valve arrangement. As soon as the fill level in the fuel has reached a specific level during filling, the float of the stated valve arrangement is raised and brings about a closing of the valve arrangement. Since no further air or gasses can subsequently be discharged out of the tank interior, a small excess pressure and thus counterpressure in the filling tube of the fuel tank arises with the further supply of fuel, which counterpressure is detected by the tank nozzle and brings about an automatic switching off of the fuel supply.

However, with a volume-modifying element provided in the tank interior, the stated float-controlled valve arrangement furthermore closes when the stated specific fill level is reached, but in the case of subsequent further fuel supply initially at least no excess pressure is generated, rather air is displaced out of the volume-modifying element into the surroundings which was previously, namely, for example, in the case of a fuel tank which is only quarter-filled, located therein. Thus, after closing of the stated valve arrangement, further fuel is still filled into the fuel tank which is fundamentally undesirable since this leads to overfilling of the fuel tank. It is therefore proposed according to the invention to prevent an influence of the volume-modifying element on the maximum fill level, i.e. eliminate such an influence, by way of a suitable measure.

A first possible such measure provides that the volume-modifying element is arranged in the fuel tank such that in the case of a vehicle standing on a horizontal surface, as seen in the vertical axis direction, the upper side of the volume-modifying element is not located appreciably above that fuel fill level at which the stated valve arrangement closes. It is therefore ensured by this measure that in the case of a filling process of the fuel tank at the time of closing of the stated float-controlled valve arrangement, the volume of the volume-modifying element is already minimal since already before the time of closing the valve arrangement the air previously contained therein was displaced out of the compensating volume by the rising fuel level.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic diagram representing a sequence of figures of a fuel tank of a tank system according to an embodiment of the invention, wherein each individual representation shows consecutively the ratios in the case of different fill levels or fuel levels during a filling process.

FIG. 2 is a schematic diagram representing a sequence of figures of a fuel tank of a tank system according to an embodiment of the invention, wherein each individual representation shows consecutively the ratios in the case of different fill levels or fuel levels during a filling process.

DETAILED DESCRIPTION OF THE DRAWINGS

Figure 3:
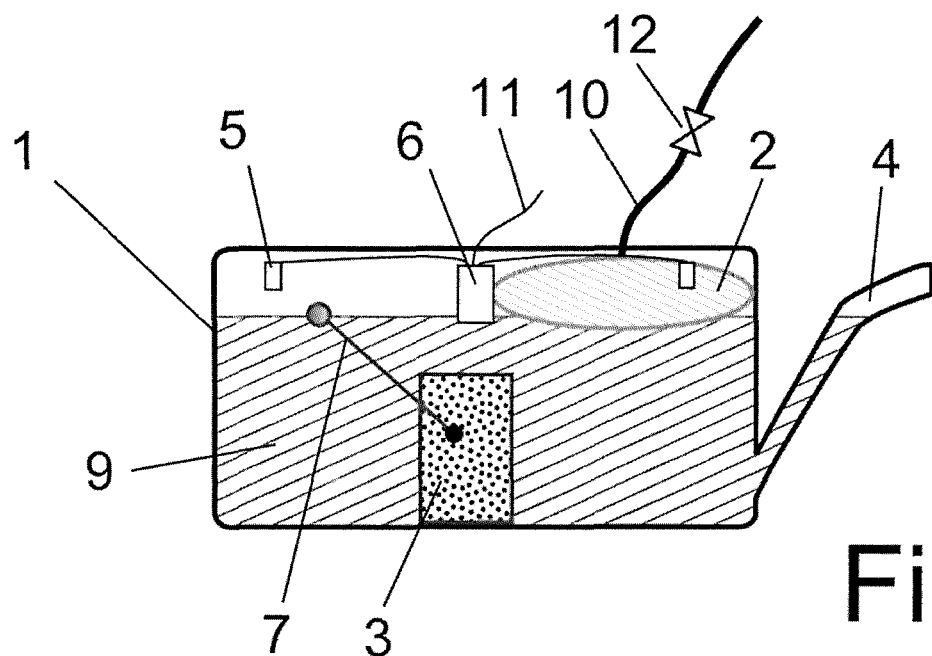
FIG. 3 is a schematic representation of a fuel tank of a tank system in a state during a filling process upon reaching the maximum fill level.

A first measure provides that the volume-modifying element is arranged in the fuel tank such that, in the case of a standing vehicle on a horizontal surface as viewed in a vertical axis direction, the upper side of the volume-modifying element is not located appreciably above a fuel fill level at which a valve arrangement closes.

This first measure itself can be represented in various ways explained with reference to FIGS. 1 and 2. Each of these FIGS. 1, 2 is represented per se as a sequence of figures, comprising three individual schematic representations, marked by additional letters A, B, C, of a fuel tank of a tank system according to the invention of a motor vehicle. Individual representations A, B, C consecutively show the ratios in the case of different fill levels or fuel levels during a filling process and in all the figures identical elements are designated by the same reference numbers—for the sake of improved clarity, however, in FIGS. 1, 2 only in their representations 1A, 2A.

Thus initially with reference to FIGS. 1A, 1B, 1C, a fuel tank is designated by reference number 1, which fuel tank can be filled with fuel as normal via a filling nozzle 4. Fuel tank 1 is represented together with a fuel quantity 9 located therein in a position of use in the case of which a motor vehicle (not shown) having said fuel tank 1 stands on a horizontal surface as is normal when filling fuel tank 1. A vertical axis (of tank 1 or of the vehicle) thus extends in the drawing plane on the respective horizontal arrow pointing from A to C perpendicularly from the bottom to the top.

A volume-modifying element 2 is provided in the tank interior, the function and possible configuration of which is described in detail in the above-mentioned. WO 2016/012284 document. What is known as the compensating volume, which lies within said volume-modifying element 2, of volume-modifying element 2 is connected practically continuously to the surroundings via a separate so-called compensating ventilation line 10. There is furthermore provided in the interior of fuel tank 1, lying relative far towards the top in the stated vertical axis direction, a float-controlled valve arrangement 6 via which a tank ventilation line 11, which connects the interior of fuel tank 1 to the surroundings, can be shut off or then is shut off by a rise of the float of valve arrangement 6 if a maximum fill level, which is represented in single representation C, is reached with a fuel fill level 9 which is rising (according to single representations A, B, C). A commonplace roll-over valve arrangement 6 is still coupled as normal to valve arrangement 6, by which valve arrangement 5 an aeration of fuel tank 1 could, where necessary, be carried out in the case of closed valve arrangement 6. For the purpose of clarity, it is mentioned in this context that present tank ventilation line 11 corresponds to the portion represented in above-mentioned WO 2016/012284, for example, in FIG. 1 there under reference number 6, of the tank ventilation line there between its fuel tank 1 and its valve unit 7.

According to the measure represented in present sequence of FIGS. 1 (1A, 1B, 1C) for eliminating an influence of volume-modifying element 2 on maximum fill level 9, in FIG. 1C, as already stated, volume-modifying element 2 is arranged in fuel tank 1 in such a manner that, in the case of a vehicle standing on a horizontal surface as seen in the vertical axis direction, the upper side of volume-modifying element 2 is not located appreciably above that fuel fill level at which stated valve arrangement 6 closes. In concrete terms, for this purpose, fuel tank 1 is formed in such a manner that, as seen in the vertical axis direction, the inside of the upper tank wall where volume-modifying element 2 is arranged lies lower to an adequate degree than in the region of valve arrangement 6 which closes in a float-controlled manner. In other words, the upper tank wall is embodied in a stepped manner so that, as seen in the vertical axis direction, a sufficiently large interior volume of fuel tank 1 in which float-controlled valve arrangement 6 is then provided is still located above volume-modifying element 2 to the side thereof. This above-mentioned interior volume which is provided above volume-modifying element 2 and which is sufficiently large should be at least so large that the gas volume required in the case of a fuel tank 1 filled up to the maximum fill level for its functional safety is present therein.

Now, turning to (present) sequence of FIGS. 2A-2C, what is known as a retaining device 13 is provided here in the interior of fuel tank 1, which retaining device 13 retains volume-modifying element 2, as seen in the vertical axis direction, further towards the bottom than said volume-modifying element 2 would be located in the interior without such a retaining device 13. Retaining device 13 retains volume modifying element 2 in such a manner that it is prevented from lying appreciably higher, as seen in the vertical axis direction, than the fuel fill level at which float-controlled valve arrangement 6 closes. For example, retaining device 13 can be formed as a flat sheet which is preferably provided with apertures or passage openings for fuel and which is suspended lying horizontally approximately in the region of the lower edge of float-controlled valve arrangement 6 in a suitable manner in the interior of fuel tank 1 or is fastened to side walls of fuel tank 1. The surface of such a sheet-like retaining element 13 corresponds substantially to the "base surface" projected onto a horizontal plane of volume-modifying element 2 which is filled with air. As the sequence of FIGS. 2A to 2C clearly shows, the compensating volume of volume-modifying element 2 is progressively reduced/minimized during filling of fuel tank 1 as a result of rising fuel level 9 if, according to FIG. 2C, float-controlled valve arrangement 6 closes.

A further measure for eliminating an influence of volume-modifying element 2 on the maximum fill level is now explained without direct reference to a figure representation. Accordingly, a/the tank ventilation line (11) leading from the float-controlled valve arrangement (6) into the surroundings or a/the compensating ventilation line (10) connecting the compensating volume of the volume-modifying element (2) to the surroundings are configured or dimensioned in such a manner that, in the case of an identical air volume flow of less than or equal to 60 liters per minute in these ventilation lines (10, 11), the drop in pressure in the compensating ventilation line (10) is at most half as large as that in the tank ventilation line (11). It is thus ensured in any event in the case of conventionally dimensioned fuel tanks (1) of automobiles that, during a filling process of the tank (1), when the maximum fill level is reached and thus the float-controlled valve arrangement (6) closes as a result of the relatively high flow resistance in the compensating ventilation line (10), considered chronologically, only such a small quantity of air can be discharged out of the volume-modifying element (2) into the surroundings that, with the further supply of fuel into the fuel tank (1), a high counterpressure arises in this or its filling tube such that the conventional switch-off automatic mechanism mentioned above of a tank nozzle is activated.

A further measure for eliminating an influence of volume-modifying element 2 on the maximum fill level is now explained on the basis of enclosed FIG. 3 in which only the state during a filling process of fuel tank 1 upon reaching the maximum fill level. i.e. when float-controlled valve arrangement 6 closes, is represented. The latter can be ascertained by an electronic control unit (not shown) by way of a conventional lever-type sensor 7 or generally by way of a fill level sensor 7 which of course is also provided in fuel tank 1 of FIGS. 1, 2 as normal but is not represented there for the sake of simplicity. In the present case, the float-controlled lever-type sensor 7 is attached in an articulated manner to a surge tank 3, but this also is not significant for the present invention. It is, however, vital that a shutoff valve or throttle valve 12 which can be actuated by the above-mentioned electronic control unit, generally referred to as actuable valve 12, is provided in compensating ventilation line 10. If, during a filling process of fuel tank 1, the stated electronic control unit identifies via fill level sensor 7 (or lever-type sensor 7) that the maximum fill level is reached, it closes actuable valve 12 in compensating ventilation line 10 at least to an extent that only so little (the principle explained in the paragraph above is used in this case) or no air at all can be discharged out of volume-modifying element 2 into the surroundings such that, with the further supply of fuel into fuel tank 1, a high counterpressure arises in this or its filling tube such that the conventional switch-off automatic mechanism mentioned above of a tank nozzle is activated.

Figure 4:
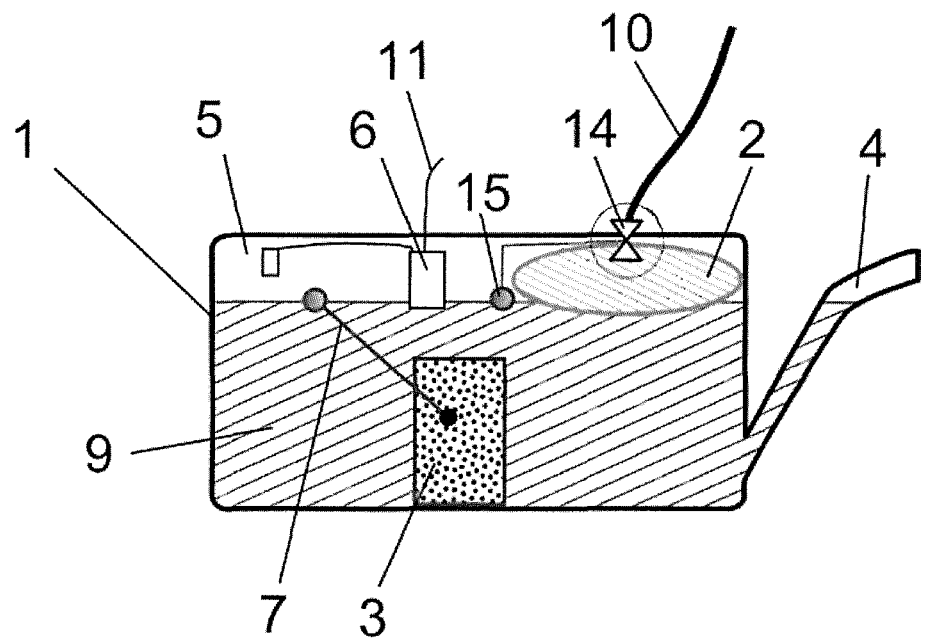
FIG. 4 is a schematic representation of a fuel tank of a tank system in a state during a filling process upon reaching the maximum fill level.

Using the same principle as in the case of the exemplary embodiment of FIG. 3, the explained exemplary embodiment according to FIG. 4 also only shows in the fully filled state a different valve 14 in the connection between the compensating volume of volume modifying element 2 and the surroundings which is at least partially closed by a float 15 which is displaced as a result of the fill level which rises during filling. This involves a purely mechanically operating or activated valve 14 which, for the sake of safety, can have low leakage or permeability. The valve 14 can also be configured such that its through-flow resistance, caused with a rising fill level in fuel tank 1, continuously rises as a result of the displacement of float 15.

A further measure to eliminate an influence of the volume-modifying element on the maximum fill level can lie in the valve arrangement which closes in a float-controlled manner being configured such that, when filling the fuel tank after closing the stated valve arrangement, by displacement of air out of the volume-modifying element precisely so much fuel can be filled into the fuel tank until the desired maximum fill level has been reached in the case of a minimal compensating volume of the volume-modifying element. There is however, uncertainty in this case as to how much air is actually located or was located in the volume-modifying element at the time of the closing of the stated float-controlled valve arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tank system of a motor vehicle, comprising:
a fuel tank;
a volume-modifying element arranged in an interior of the fuel tank at least substantially above a liquid level, wherein the volume-modifying element forms a compensating volume connected to surroundings of the fuel tank;
a valve arrangement that closes in a float-controlled manner when filling the fuel tank so as to bring about a maximum fill level in the fuel tank;
means for eliminating an influence of the volume-modifying element on the maximum fill level in the fuel tank; and
a retaining device arranged in the interior of the fuel tank, wherein the retaining device is a flat sheet which is suspended lying horizontally approximately in a region of a lower edge of the valve arrangement and the volume-modifying element has an upper side retained by the retaining device so as not to extend appreciably higher as viewed in the vertical axis direction than that fuel fill level at which the valve arrangement closes.

2. A tank system of a motor vehicle, comprising:
a fuel tank;
a volume-modifying element arranged in an interior of the fuel tank at least substantially above a liquid level, wherein the volume-modifying element forms a compensating volume connected to surroundings of the fuel tank;
a valve arrangement that closes in a float-controlled manner when filling the fuel tank so as to bring about a maximum fill level in the fuel tank; and
means for eliminating an influence of the volume-modifying element on the maximum fill level in the fuel tank;
wherein the fuel tank is configured such that, as viewed in the vertical axis direction, an inner side of an upper tank wall below which the volume-modifying element is arranged lies lower than in a region of the valve arrangement that closes in the float-controlled manner.

3. A tank system of a motor vehicle, comprising:
a fuel tank;
a volume-modifying element arranged in an interior of the fuel tank at least substantially above a liquid level, wherein the volume-modifying element forms a compensating volume connected to surroundings of the fuel tank;
a valve arrangement that closes in a float-controlled manner when filling the fuel tank so as to bring about a maximum fill level in the fuel tank; and
means for eliminating an influence of the volume-modifying element on the maximum fill level in the fuel tank;
wherein the means for eliminating the influence of the volume-modifying element comprises:
an actuable valve provided in a connection between the compensating volume of the volume-modifying element and the surroundings, said actuable valve being actuated in a closing direction when a fuel fill level, which rises during filling, has reached the maximum fill level.

4. The tank system as claimed in claim 3, wherein
the actuable valve is at least partially closed by a float which is displaced as a result of the fill level rising during filling.

5. A tank system of a motor vehicle, comprising:
a fuel tank:
a volume-modifying element arranged in an interior of the fuel tank at least substantially above a liquid level, wherein the volume-modifying element forms a compensating volume connected to surroundings of the fuel tank;
a valve arrangement that closes in a float-controlled manner when filling the fuel tank so as to bring about a maximum fill level in the fuel tank; and
means for eliminating an influence of the volume-modifying element on the maximum fill level in the fuel tank;
wherein the means for eliminating the influence of the volume-modifying element comprises:
a valve provided in a connection between the compensating volume of the volume-modifying element and the surroundings, said valve being at least partially closed by a float which is displaced as a result of a fuel fill level rising during filling.

6. A tank system of a motor vehicle, comprising:
a fuel tank;
a volume-modifying element arranged in an interior of the fuel tank at least substantially above a liquid level, wherein the volume-modifying element forms a compensating volume connected to surroundings of the fuel tank;
a valve arrangement that closes in a float-controlled manner when filling the fuel tank so as to bring about a maximum fill level in the fuel tank;

means for eliminating an influence of the volume-modifying element on the maximum fill level in the fuel tank;
a tank ventilation line leading from the valve arrangement that closes in the float-controlled manner into the surroundings; and
a compensating ventilation line that connects the compensating volume of the volume-modifying element to the surroundings, wherein
the tank ventilation line and the compensating ventilation line are dimensioned such that, in a case of an identical air volume flow of less than or equal to 60 liters per minute, a drop in pressure in the compensating ventilation line is at most half as large as that in the tank ventilation line.

* * * * *